US010581669B2

(12) United States Patent
Mathew et al.

(10) Patent No.: US 10,581,669 B2
(45) Date of Patent: Mar. 3, 2020

(54) RESTORING CONTROL-PLANE CONNECTIVITY WITH A NETWORK MANAGEMENT ENTITY

(71) Applicant: Nicira, Inc., Palo Alto, CA (US)

(72) Inventors: Subin Cyriac Mathew, Palo Alto, CA (US); Ankur Kumar Sharma, Palo Alto, CA (US); Alexander Tessmer, Palo Alto, CA (US); Vivek Agarwal, Palo Alto, CA (US); Ganesan Chandrashekhar, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 427 days.

(21) Appl. No.: 15/451,434

(22) Filed: Mar. 7, 2017

(65) Prior Publication Data

US 2018/0262387 A1  Sep. 13, 2018

(51) Int. Cl.
*H04L 12/24* (2006.01)
*H04L 29/08* (2006.01)
*G06F 9/455* (2018.01)
*H04L 29/14* (2006.01)
*H04L 29/06* (2006.01)
*H04L 12/26* (2006.01)

(52) U.S. Cl.
CPC ...... *H04L 41/0695* (2013.01); *G06F 9/45558* (2013.01); *H04L 41/0668* (2013.01); *H04L 67/2852* (2013.01); *H04L 67/2861* (2013.01); *H04L 67/38* (2013.01); *H04L 69/40* (2013.01); *G06F 2009/45579* (2013.01); *G06F 2009/45583* (2013.01); *G06F 2009/45595* (2013.01); *H04L 43/0811* (2013.01)

(58) Field of Classification Search
CPC ............ H04L 41/0695; H04L 41/0668; H04L 43/0881; H04L 67/2852; H04L 67/2861; H04L 67/38; H04L 69/40; G06F 9/45558; G06F 2009/45579; G06F 2009/45583; G06F 2009/45595
USPC ....................................................... 709/224
See application file for complete search history.

(56) References Cited

U.S. PATENT DOCUMENTS

| 7,965,630 | B1 * | 6/2011 | Floyd | H04L 67/1025 370/230 |
| 2003/0128668 | A1 * | 7/2003 | Yavatkar | H04L 45/02 370/238 |

(Continued)

*Primary Examiner* — James E Springer
(74) *Attorney, Agent, or Firm* — Su IP Consulting

(57) ABSTRACT

Example methods are provided for a first host to restore control-plane connectivity with a network management entity. The method may comprise: detecting a loss of control-plane connectivity between the first host and the network management entity; and determining connectivity status information associated with one or more second hosts. The method may also comprise, based on the connectivity status information, selecting, from the one or more second hosts, a proxy host having data-plane connectivity with the first host and control-plane connectivity with the network management entity. The method may further comprise restoring control-plane connectivity between the first host with the network management entity via the proxy host such that the first host is able to send control information to, or receive control information from, the network management entity via the proxy host.

15 Claims, 5 Drawing Sheets

(56) References Cited

U.S. PATENT DOCUMENTS

| | | | |
|---|---|---|---|
| 2016/0013971 A1* | 1/2016 | Caviglia | H04L 41/06 370/225 |
| 2016/0248664 A1* | 8/2016 | Huang | H04L 45/64 |
| 2017/0118066 A1* | 4/2017 | Mathew | H04L 41/0663 |
| 2017/0317953 A1* | 11/2017 | Sareen | H04L 49/25 |
| 2018/0183709 A1* | 6/2018 | Tsuchiya | H04L 45/38 |
| 2018/0287859 A1* | 10/2018 | Desigowda | H04L 41/0695 |
| 2019/0238509 A1* | 8/2019 | Hira | G06F 9/45558 |

* cited by examiner

RESTORING CONTROL-PLANE CONNECTIVITY WITH A NETWORK MANAGEMENT ENTITY

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Data Center (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc.

Further, through network virtualization, benefits similar to server virtualization may be derived for networking services in the SDDC. For example, multiple logical networks with different rules and policies may be supported by the same physical network. In this case, control information relating to logical networks and overlay transport tunnels may be collected and disseminated using a network management entity, such as a Software-Defined Network (SDN) controller. In practice, however, a host may lose connectivity with the network management entity, in which case the host will not be able to obtain the latest control information.

DETAILED DESCRIPTION

Figure 1:
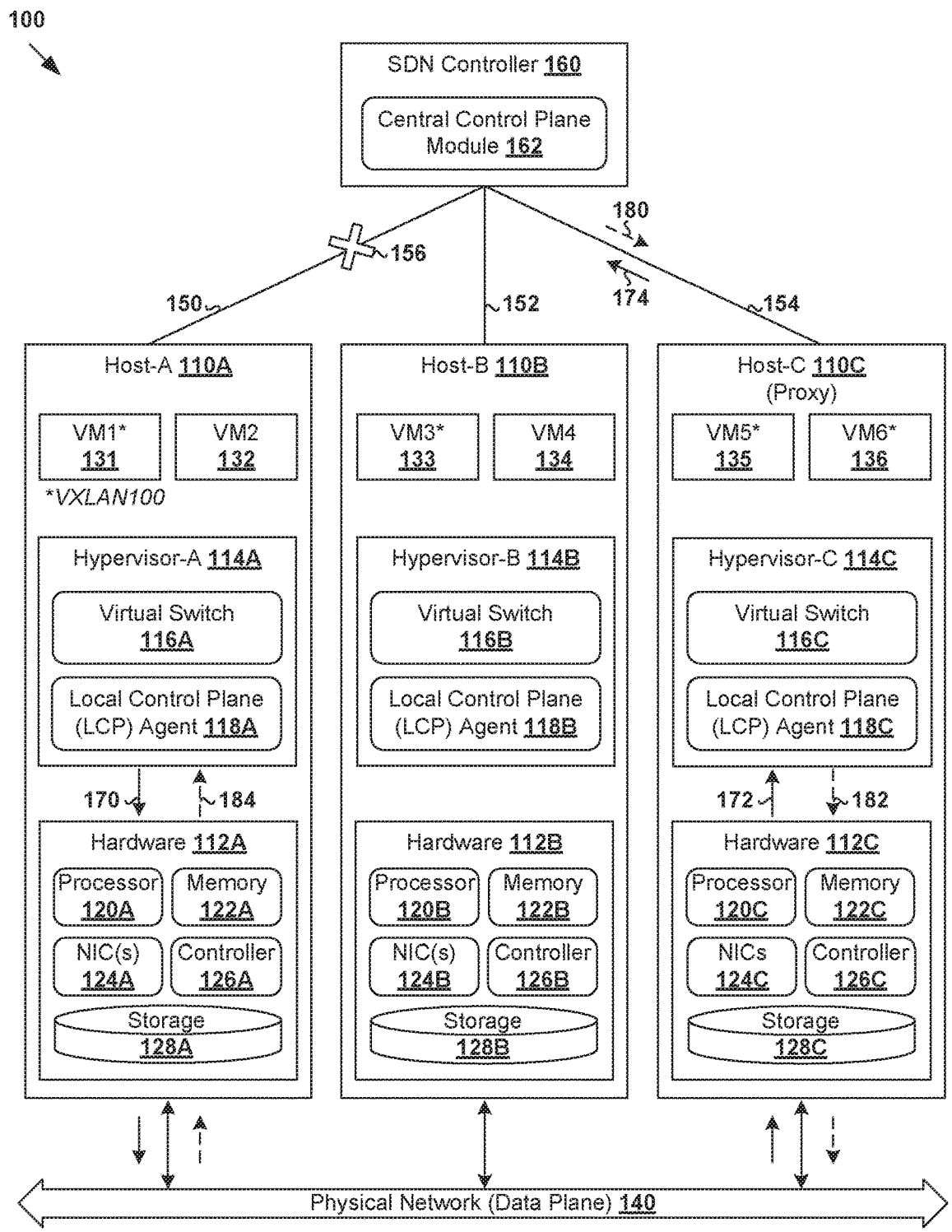
FIG. 1 is a schematic diagram illustrating an example virtualized computing environment in which control-plane connectivity with a network management entity may be restored.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to control-plane connectivity will now be explained in more detail using FIG. 1, which is a schematic diagram illustrating example virtualized computing environment 100 in which control-plane connectivity with a network management entity may be restored. It should be understood that, depending on the desired implementation, virtualized computing environment 100 may include additional and/or alternative components than that shown in FIG. 1.

In the example in FIG. 1, virtualized computing environment 100 includes multiple hosts, such as host-A 110A, host-B 110B and host-C 110C that are inter-connected via physical network 140. Each host 110A/110B/110C includes suitable hardware 112A/112B/112C and virtualization software (e.g., hypervisor-A 114A, hypervisor-B 114B, hypervisor-C 114C) to support various virtual machines. For example, host-A 110A supports VM1 131 and VM2 132; host-B 110B supports VM3 133 and VM4 134; and host-C 110C supports VM5 135 and VM6 136. In practice, virtualized computing environment 100 may include any number of hosts (also known as a "computing devices", "host computers", "host devices", "physical servers", "server systems", etc.), where each host may be supporting tens or hundreds of virtual machines.

Although examples of the present disclosure refer to virtual machines 131-136, it should be understood that a "virtual machine" running on host 110A/110B/110C is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computational environments, containing virtual equivalents of the hardware and software components of a physical computing system. The term "hypervisor" may refer generally to a software layer or component that supports the execution of multiple virtualized computing instances, including system-level software that supports namespace containers such as Docker, etc.

Hypervisor 114A/114B/114C maintains a mapping between underlying hardware 112A/112B/112C and virtual resources allocated to respective virtual machines 131-136. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications. For example, corresponding to hardware 112A/112B/112C, the virtual resources may include virtual CPU, virtual memory, virtual disk, virtual network interface controller (VNIC), etc. Hypervisor 114A/114B/114C further implements virtual switch 116A/116B/116C to handle egress packets from, and ingress packets to, respective virtual machines 131-136. The term "packet" may refer generally to a group of bits that can be transported together from a source to a destination, such as message, segment, datagram, etc.

SDN controller 160 is a "network management entity" that facilitates network virtualization in virtualized computing environment 100. Through network virtualization, logical networks may be provisioned, changed, stored, deleted and restored programmatically without having to reconfigure the underlying physical hardware. SDN controller 160 may be implemented using physical machine(s), virtual machine(s), or both. One example of an SDN controller is the NSX controller component of VMware NSX® (available from VMware, Inc.) that operates on a central control plane. SDN controller 160 may be a member of a controller cluster (not shown) that is configurable using an SDN manager.

Logical networks may be formed using any suitable tunneling protocol, such as Virtual eXtension Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1, VM1 131 on host-A 110A, VM3 133 on host-B 110B, as well as VM5 135 and VM6 136 on host-C 110C, may be configured as members of a first VXLAN logical network (e.g., VXLAN100). A second VXLAN logical network (e.g., VXLAN200) may be configured with VM2 132 on host-A 110A and VM4 134 on host-B 110B as members. To facilitate communication among members of a logical network, hypervisor 114A/114B/114C implements a virtual tunnel endpoint (VTEP) to encapsulate and decapsulate packets with a tunnel header identifying the logical network.

SDN controller 160 is responsible for collecting and disseminating control information relating to logical networks and overlay transport tunnels, such as logical network topology, membership information of logical networks, mobility of the members, protocol-to-hardware address mapping information of the members, VTEP information, firewall rules and policies, etc. To send and receive the control information, local control plane (LCP) agent 118A/118B/118C on host 110A/110B/110C requires control-plane connectivity 150/152/154 with SDN controller 160. As used herein, the term "control-plane connectivity" may refer generally the ability of SDN controller 160 and host 110A/110B/110C to communicate with each other, such as over a management network. To provide the control-plane connectivity, a control-plane channel (or more simply "control channel") may be established between SDN controller 160 and host 110A/110B/110C using any suitable protocol, such as using Transmission Control Protocol (TCP) over Secure Sockets Layer (SSL), etc.

Host 110A/110B/110C also requires data-plane connectivity with other host(s), such as to facilitate communication among members of a logical network, exchange connectivity status information, etc. For example in FIG. 1, host-A 110A requires data-plane connectivity with host-B 110B for VM1 131 to be able to send packets to, and receive packets, from VM3 133. As used herein, the term "data-plane connectivity" may refer generally to the ability of two hosts to communicate with each other, such as over (data-plane) physical network 140. Physical network 140 may include any suitable number of interconnected network devices, such as layer-3 routers, layer-2 switches, gateway devices, etc. The term "layer 2" may refer generally to a Media Access Control (MAC) layer; and "layer 3" to a network or Internet Protocol (IP) layer in the Open System Interconnection (OSI) model, although the concepts described herein may be used with other networking models.

In practice, host 110A/110B/110C may lose control-plane connectivity 150/152/154 with SDN controller 160. For example, in a multi-site deployment, host-A 110A located at one site might lose control-plane connectivity (see 156 in FIG. 1) with SDN controller 160 located in at different site. Due to such disruption, host-A 110A will be unable to send and receive the latest control information. Conventionally, host-A 110A may be configured to rely on cached control information until the control-plane connectivity is restored. However, the use of cached information is designed to address the problem of SDN controller 160 failing. In contrast, if SDN controller 160 is still up and running and capable of updating rules and policies, host-A 110A will be out-of-synchronization with SDN controller 160. This adversely affects the performance of host-A 110A and associated logical networks.

Restoring Control-Plane Connectivity

According to examples of the present disclosure, the control-plane connectivity between host-A 110A and SDN controller 160 may be automatically restored via a proxy host (e.g., host-C 110C) that has connectivity with SDN controller 160. Instead of relying on static cached information that may expire after a period of time, host-A 110A may continue to receive the latest control information from, or send the latest control information to, SDN controller 160 via the proxy host. This fault tolerance mechanism facilitates the implementation of high availability control-plane connectivity, thereby reducing the likelihood of host-A 110A being out-of-synchronization with SDN controller 160.

Figure 2:
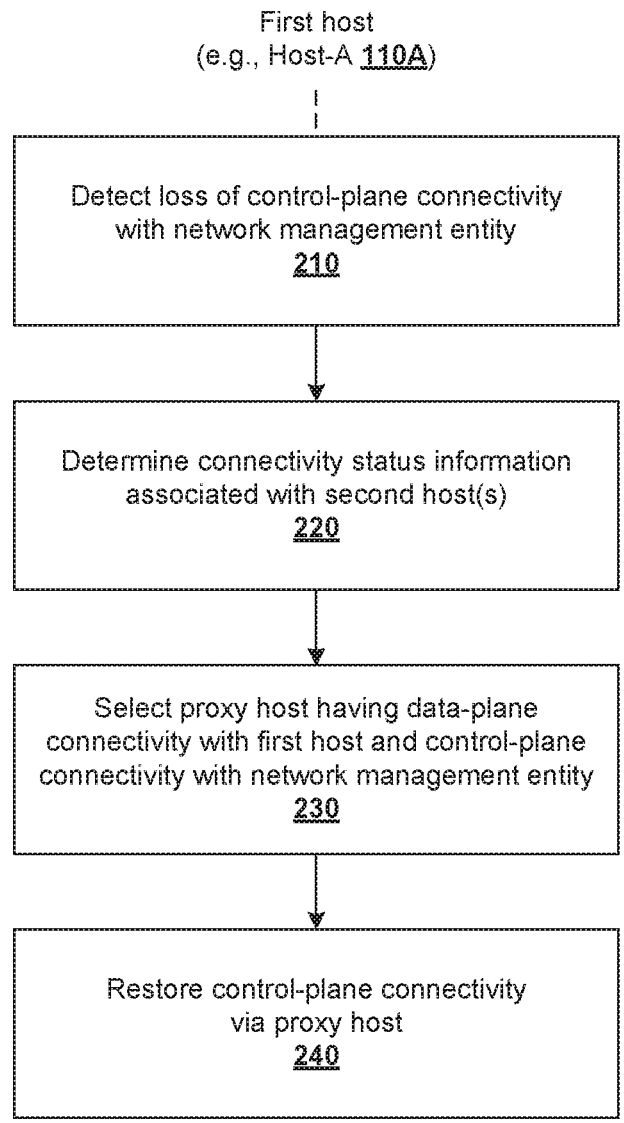
FIG. 2 is a flowchart of an example process for a first host to restore control-plane connectivity with a network management entity.

In more detail, FIG. 2 is a flowchart of example process 200 for a first host to restore control-plane connectivity with SDN controller 160. Example process 200 may include one or more operations, functions, or actions illustrated by one or more blocks, such as 210 to 240. The various blocks may be combined into fewer blocks, divided into additional blocks, and/or eliminated depending on the desired implementation.

Throughout the present disclosure, various examples will be explained using host-A 110A as an example "first host"; host-B 110B and host-C 110C as example "second hosts"; and host-C 110C as an example "proxy host," and SDN controller 160 as an example "network management entity." In practice, example process 200 may be implemented by any suitable host, such as host 110A/110B/110C using LCP agent 118A/118B/118C supported by hypervisor 114A/114B/114C. LCP agent 118A/118B/118C may communicate with central control plane module 162 at SDN controller 160 to send and receive control information.

At 210 in FIG. 2, host-A 110A detects a loss of control-plane connectivity between host-A 110A and SDN controller 160 (see also 156 in FIG. 1). At 220 in FIG. 2, host-A 110A determines connectivity status information associated with host-B 110B and host-C 110C. For example, the connectivity status information may be determined using any suitable fault detection protocol, such as Bidirectional Forwarding Detection (BFD), Connectivity Fault Management (CFM), etc. Prior to the loss of control-plane connectivity, a fault detection session (e.g., BFD session) may be configured between different pairs of hosts for fault detection at predetermined time intervals.

As will be described further below, block 220 in FIG. 2 may involve host-A 110A generating and sending a first fault detection message to report that host-A 110A has lost control-plane connectivity with SDN controller 160. In response to receiving a second fault detection message from a particular host (e.g., host-C 110C), host-A 110A may determine that the particular host has data-plane connectivity with itself. Further, based on the second fault detection message, host-A 110A may determine whether the particular host has control-plane connectivity with SDN controller 160. In absence of the second fault detection message, host-A 110A may determine that the particular host does not have data-plane connectivity with itself.

At 230 in FIG. 2, based on the connectivity status information, host-A 110A selects a proxy host (e.g., host-C 110C) that has data-plane connectivity with host-A 110A and control-plane connectivity with SDN controller 160. Besides the connectivity status information, the proxy host may also be selected based on its location (e.g., same network segment as host-A 110A), resource utilization, whether the proxy host is currently acting as a proxy host for another host, etc.

At 240 in FIG. 2, host-A 110A restores control-plane connectivity between the host-A 110A and SDN controller 160 via proxy host-C 110C such that host-A 110A is able to send control information to SDN controller 160 (see 170, 172, 174 in FIG. 1), or receive control information from SDN controller 160 (see 180, 182, 184 in FIG. 1), via proxy host-C 110C. This way, host-A 110A may have indirect control-plane connectivity with SDN controller 160 via proxy host-C 110C, when its direct control-plane connectivity with SDN controller 160 is lost (see 156 in FIG. 1).

As will be described further below, block 240 in FIG. 2 may involve host-A 110A establishing a data-plane channel between host-A 110A and proxy host-C 110C to trigger proxy host-C 110C to establish a control-plane channel with SDN controller 160. This way, the control information may be sent and received via the proxy host using the data-plane channel and control-plane channel. Using example process 200, as long as there is one host in virtualized computing environment 100 that has connectivity with SDN controller 160, other hosts may also continue to communicate with SDN controller 160. This improves the availability of SDN controller 160 to all hosts, and reduces the likelihood of hosts being out-of-synchronization.

In the following, various examples will be explained using FIG. 3 to FIG. 5B. A detailed example process for restoring control-plane connectivity will be explained using FIG. 3, example selection of a proxy host using FIG. 4A and FIG. 4B, and example restoration of control-plane connectivity via the proxy host using FIG. 5A and FIG. 5B.

Proxy Host Selection

Figure 3:
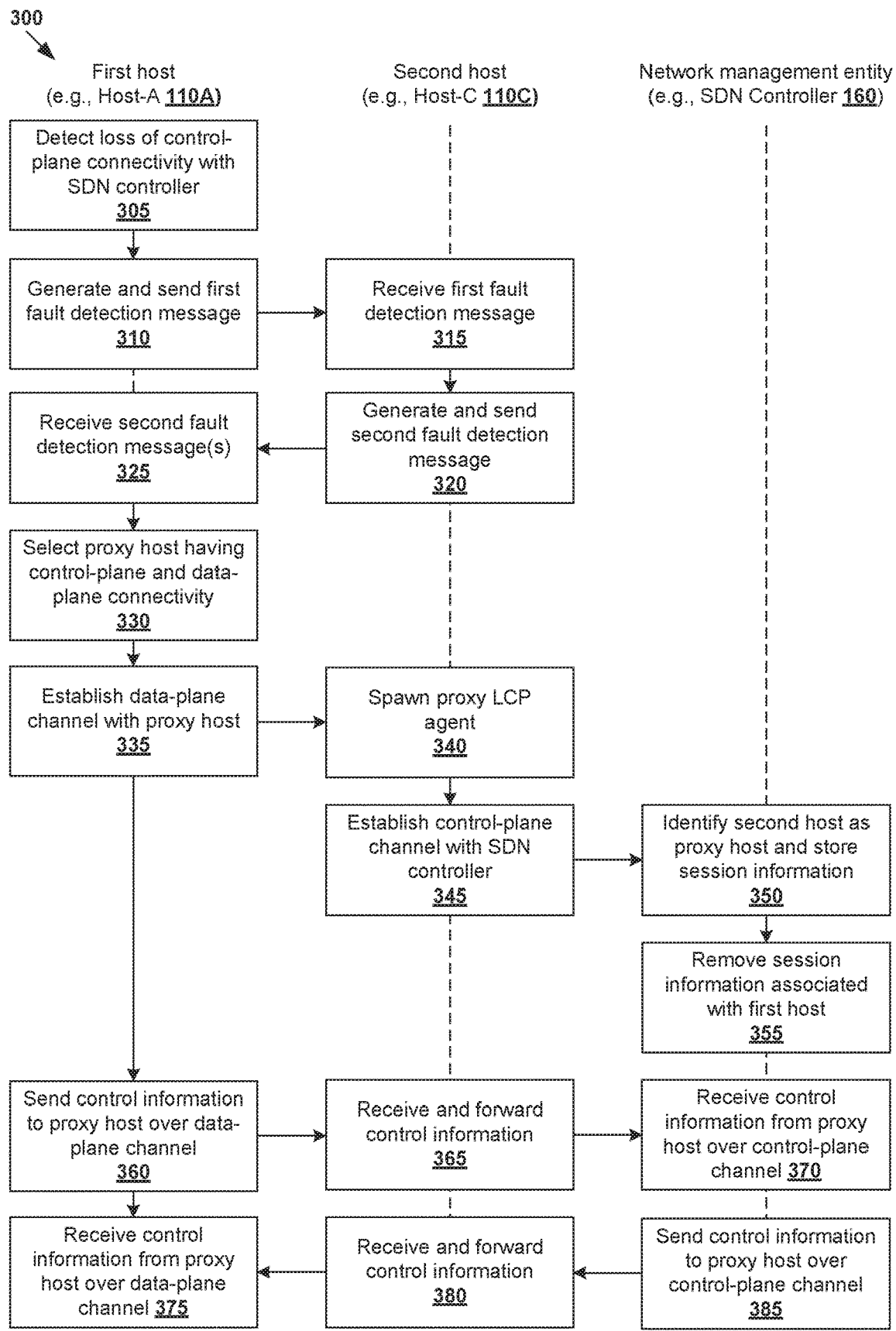
FIG. 3 is a flowchart of an example detailed process for a first host to restore control-plane connectivity with a network management entity.

FIG. 3 is a flowchart of example detailed process 300 for first host 110A to restore control-plane connectivity with a network management entity. Example process 300 may include one or more operations, functions, or actions illustrated by one or more blocks, such as 305 to 385. The various blocks may be combined into fewer blocks, divided into additional blocks, and/or eliminated depending on the desired implementation. Example process 300 may be implemented by host 110A/110B/110C using LCP agent 118A/118B/118C, and SDN controller 160 using central control plane module 162, etc.

At 305 in FIG. 3, LCP agent 118A detects a loss of control-plane connectivity with SDN controller 160. In one example, this may involve detecting a disconnection of a control-plane channel (e.g., TCP connection) between LCP agent 118A and SDN controller 160. In another example, the detection may occur when there is a failure at host-A 110A, such as LCP agent 118A crashing due to an error. The loss of control-plane connectivity may also be due to a failure (e.g., power, hardware, software, etc.) at a physical switch or router connecting host-A 110A with SDN controller 160.

At 310 and 325 in FIG. 3, LCP agent 118A determines connectivity status information associated with other hosts using any suitable fault detection protocol, such as BFD, CFM, etc. For example, before the detection step at 310 in FIG. 3, an a priori monitoring session (e.g., BFD session) may be established between host-A 110A with every other host to exchange connectivity status information at predetermined time intervals.

Figure 4A:
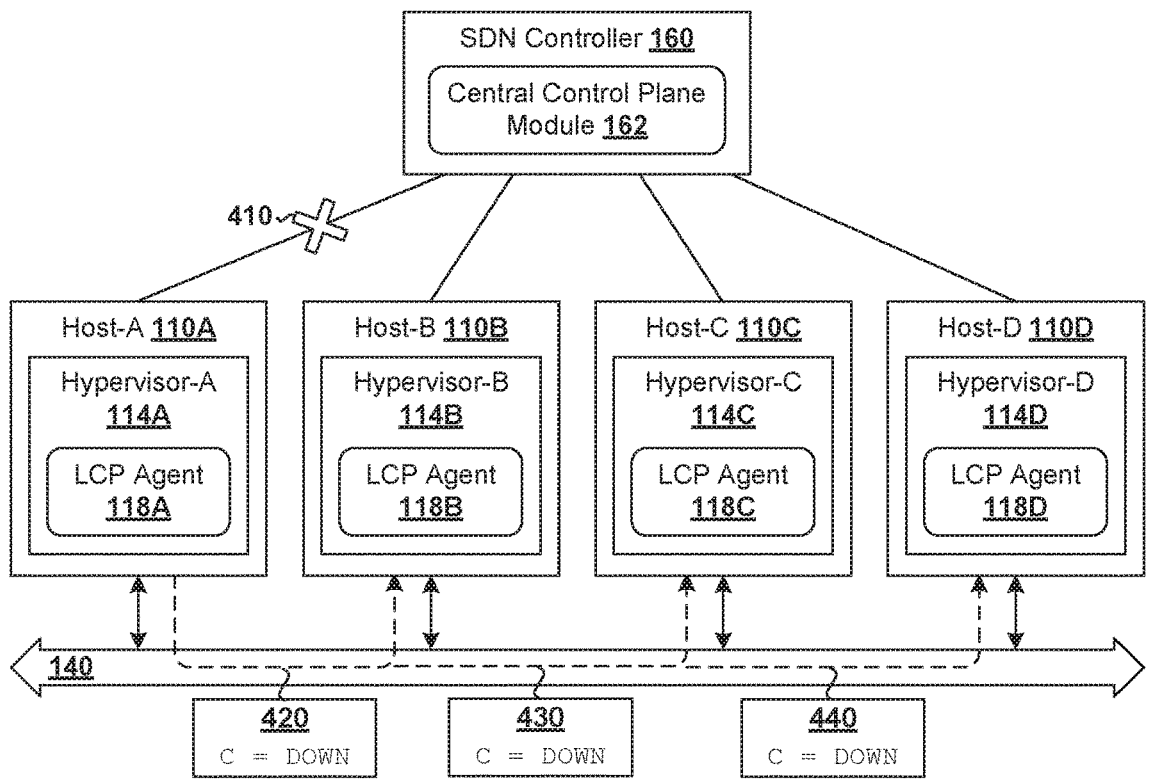
FIG. 4A is a schematic diagram illustrating an example first host sending first fault detection messages to respective second hosts.
Figure 4B:
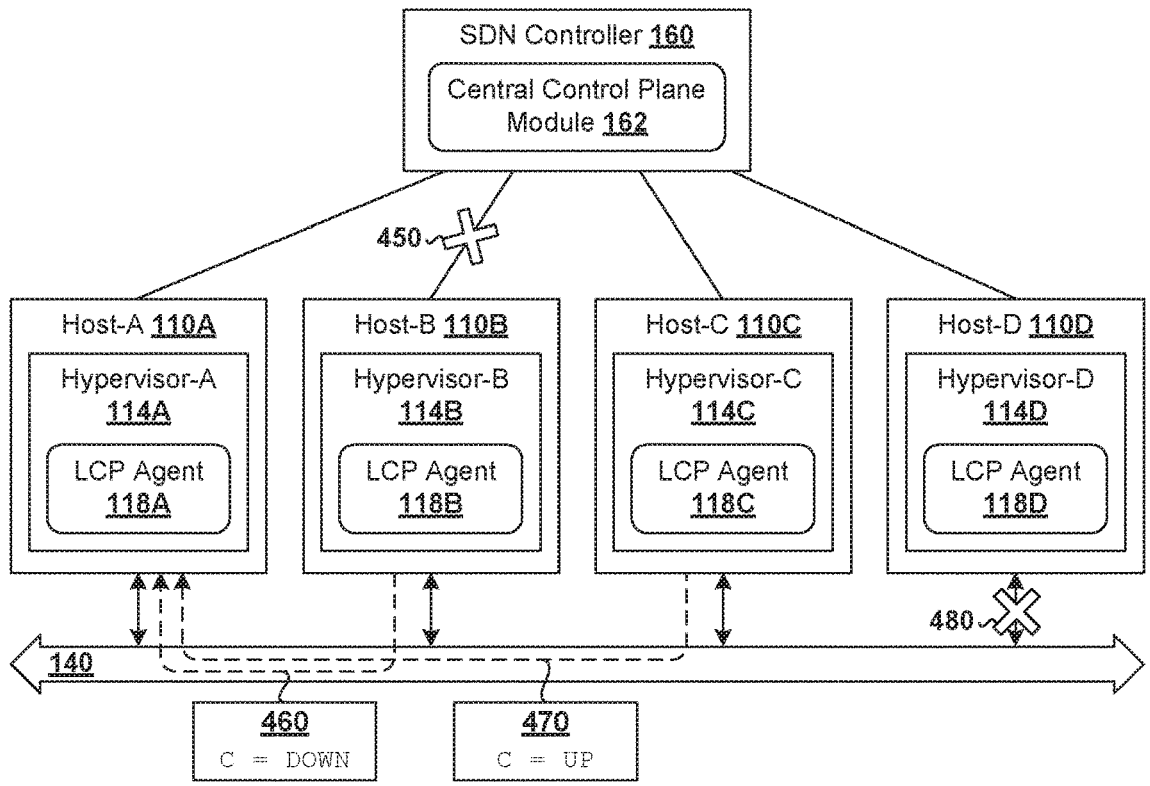
FIG. 4B is a schematic diagram illustrating an example first host receiving second fault detection messages from respective second hosts.

An example will be described below using FIG. 4A and FIG. 4B. FIG. 4A is a schematic diagram illustrating example first host 110A sending first fault detection messages to respective second hosts. FIG. 4B is a schematic diagram illustrating example first host 110A receiving second fault detection messages from respective second hosts. Host-A 110A will be used as an example "first host," host-B 110B, host-C 110C and host-D 110D as example "second hosts," a BFD message from host-A 110A as a "first fault detection message," and a BFD message from second host 110B/110C/110D as an example "second fault detection message." Host-D 110D (not shown in FIG. 1 for simplicity) may include similar components, including LCP agent 118D supported by hypervisor-D 114D, etc.

Using BFD as an example, a BFD session may be established between host-A 110A (more particularly, hypervisor-A 114A) and every other host for data-path liveness check, such as a first BFD session with hypervisor-B 114B at host-B 110B, a second BFD session with hypervisor-C 114C at host-C 110C and a third BFD session with hypervisor-D 114D at host-D 110D. A BFD session may be configured in a demand mode, which means that no Hello packets are exchanged after the BFD session is established until called upon.

In the example in FIG. 4A, when control-plane connectivity with SDN controller 160 is lost (see 410 in FIG. 4A), LCP agent 118A instructs a BFD agent (not shown for simplicity) on hypervisor-A 114A to restart or initiate the fault detection process with all other hosts or a subset of the hosts. In particular, a BFD message with "C=DOWN" (e.g., a bit in the metadata) is generated to report that host-A 110A has lost control-plane connectivity with SDN controller 160. The BFD message is then sent to host-B 110B (see 420 in FIG. 4A), host-C 110C (see 430 in FIG. 4A) and host-D 110D (see 440 in FIG. 4A). See also corresponding blocks 310 and 315 in FIG. 3.

In the example in FIG. 4B, host-B 110B detects that it has also lost control-plane connectivity with SDN controller 160, and responds with a BFD message that includes "C=DOWN" to host-A 110A (see 450 and 460 in FIG. 4B). Host-C 110C detects that it has control-plane connectivity, and sends a BFD message with "C=UP" to host-A 110A (see 470 in FIG. 4B). Host-D 110D has control-plane connectivity, but does not have data-plane connectivity with host-A 110A (see 480 in FIG. 4B). As such, no BFD message is received or sent by host-D 110D. See also corresponding blocks 320 and 325 in FIG. 3.

At 330 in FIG. 3, based on the received BFD messages, LCP agent 118A determines the connectivity status information associated with host-B 110B, host-C 110C and host-D 110D to select a proxy host. In the example in FIG. 4B, LCP agent 118A may determine that it has data-plane connectivity with host-B 110B and host-C 110C. Further, based on indication "C=DOWN" from host-B 110B (see 460 in FIG. 4B) and "C=UP" from host-C 110C (see 470 in FIG. 4B), LCP agent 118A determines that host-C 110C has control-plane connectivity with SDN controller 160, but host-B 110B does not. Due to the absence of any BFD message from host-D 110D (e.g., within a period of time), LCP agent 118A determines it does not have data-plane connectivity with host-D 110D. As such, LCP agent 118A selects host-C 110C as a proxy host to restore its control-plane connectivity with SDN controller 160.

In practice, there may be multiple candidates for a proxy host. In an alternative scenario, assume that host-B 110B, host-C 110C and host-D 110D all have data-plane connectivity with host-A 110A and control-plane connectivity with SDN controller 160. In this case, a proxy host may be selected at random, or based on additional metric(s). In one example, host-A 110A may select the proxy host based on the latter's location. For example, in order of preference, the proxy host may be selected because it is located in the same network segment as host-A 110A, same data center, different data centers etc.

In another example, host-A 110A may select the proxy host based on one or more performance-related metrics, such as whether the proxy host is already acting as a proxy host for another host (e.g., based on the number of proxy LCP agent), Central Processing Unit (CPU) utilization, memory utilization, network resource utilization, etc. These performance-related metrics may be included as metadata in the BFD messages. If all hosts are disconnected with SDN controller 160, this may indicate that SDN controller 160 (or a controller cluster that includes SDN controller 160) is down and control-plane connectivity cannot be restored until SDN controller 160 recovers.

Channel Establishment

Once a proxy host is selected, control-plane connectivity may be restored according to blocks 335 to 360 in FIG. 3. An example will be described using FIG. 5A, which is a schematic diagram illustrating example first host 110A restoring control-plane connectivity with a network management entity via a proxy host.

Figure 5A:
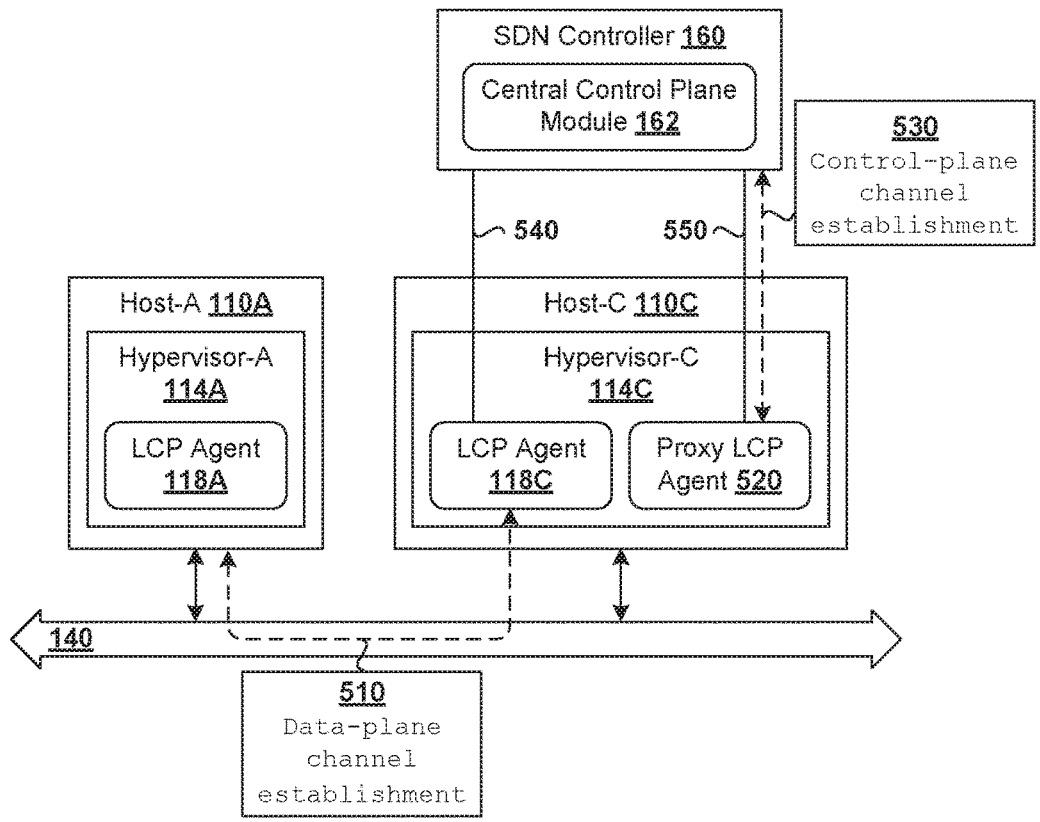
FIG. 5A is a schematic diagram illustrating an example first host restoring control-plane connectivity with a network management entity via a proxy host.

At 335 in FIG. 3, host-A 110A establishes a data-plane channel with host-C 110C, such as a TCP connection using a three-way handshake process (see 510 in FIG. 5A). This involves LCP agent 118A at host-A 110A initiating the TCP connection by sending a synchronization (SYN) packet to LCP agent 118C at host-C 110C. In practice, a destination port number in the SYN packet may be set to a predetermined port number that is reserved for a proxy host service supported by host-C 110C. This allows host-C 110C to distinguish the TCP connection from other types of connection.

In response to receiving the connection request or SYN packet, LCP agent 118C at host-C 110C responds with a synchronization-acknowledgement (SYN-ACK) packet, to which LCP agent 118A at host-A 110A responds with an ACK packet to complete the handshake. The TCP connection may be established over SSL using pre-shared keys to prevent or reduce the risk of eavesdropping or malicious attacks.

At 340 in FIG. 3, the data-plane channel establishment initiated by LCP agent 118A at host-A 110A triggers LCP agent 118C at host-C 110C to spawn or create a new LCP agent to communicate with SDN controller 160 on behalf of host-A 110A. In the example in FIG. 5A, new "standby LCP agent" or "proxy LCP agent" 520 is spawned by LCP agent proxy 118C to relay control information to and from host-A 110A.

At 345 in FIG. 3, proxy LCP agent 520 at host-C 110C establishes a control-plane channel with SDN controller 160, such as a TCP connection using a three-way handshake (see 530 in FIG. 5A). Similarly, this involves proxy LCP agent 520 sending a connection request (i.e., SYN packet) that includes a destination port number reserved for communication with proxy hosts at SDN controller 160. Proxy LCP agent 510 may also send any suitable information to SDN controller 160 to identify host-C 110C as a proxy host for host-A 110A. In response to receiving the SYN packet, SDN controller 160 responds with a SYN-ACK packet, to which proxy LCP agent 520 at host-C 110C responds with an ACK packet to complete the handshake.

At 350 in FIG. 3, the control-plane channel establishment initiated by proxy LCP agent 520 at host-C 110C triggers SDN controller 160 to store session information associated with proxy LCP agent 520. SDN controller 160 also identifies host-C 110C as a proxy host for host-A 110A. At 355 in FIG. 3, session information associated with LCP agent 118A at host-A 110A is removed.

After the above channel establishment process, there are multiple control-plane channels between SDN controller 160 and host-C 110C. As shown in FIG. 5A, first control-plane channel 540 is used by LCP agent 118C and SDN controller 160 to communicate control information associated with host-C 110C. Second control-plane channel 550 is used by proxy LCP agent 520 and SDN controller to communicate control information associated with host-A 110A.

The use of multiple LCP agents and associated control-plane channels has the advantage of segregating the control information relating to host-C 110C from that relating to host-A 110A. If host-C 110C acts as a proxy host for another host (e.g., host-B 110B), a further proxy LCP agent may be spawned to establish a third control-plane channel with SDN controller 160. Although not shown in FIG. 3 for simplicity, host-C 110C may inform host-A 110A after establishing the second session with SDN controller 160 to confirm that control-plane connectivity has been successfully restored.

Once the control-plane connectivity is restored, host-A 110A may communicate with SDN controller 160 via proxy host-C 110C according to blocks 360 to 385 in FIG. 3. An example will be described using FIG. 5B, which is a schematic diagram illustrating example first host 110A communicating with a network management entity via a proxy host.

Figure 5B:
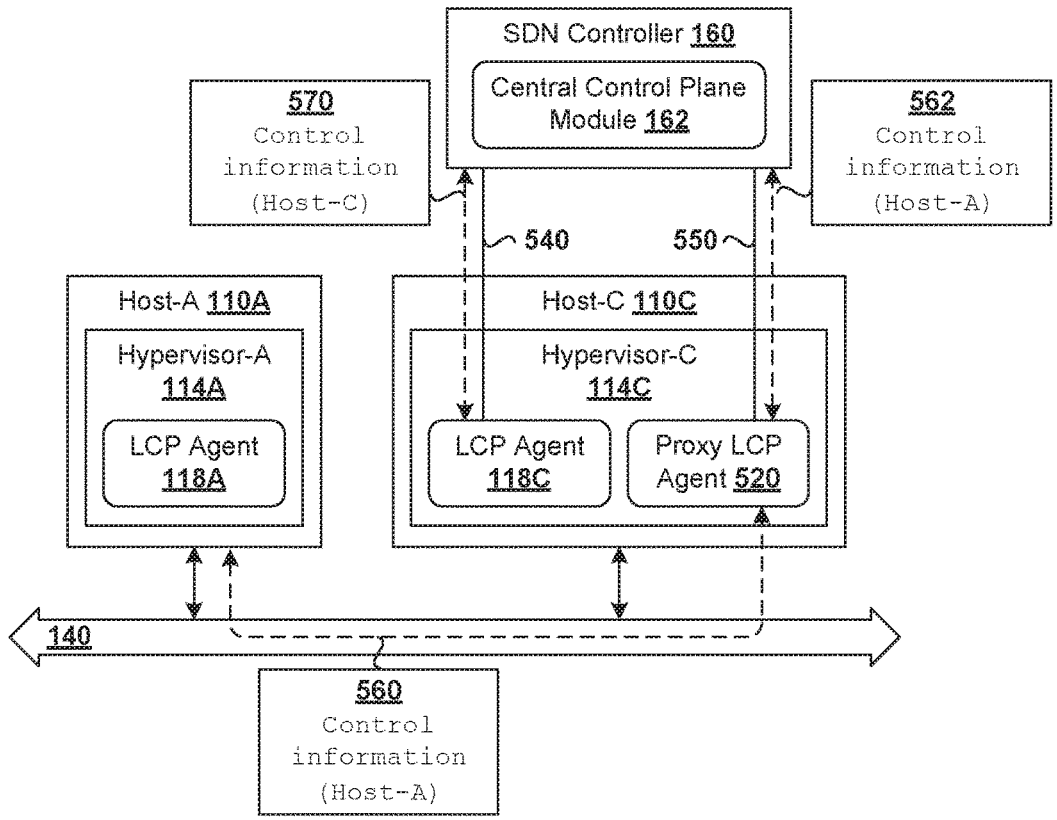
FIG. 5B is a schematic diagram illustrating an example first host communicating with a network management entity via a proxy host.

At 360 in FIG. 3, LCP agent 118A at host-A 110A may send control information destined for SDN controller 160 to proxy host-C 110C over the data-plane channel established between them (see 560 in FIG. 5B). For example, the control information may include queries initiated by a forwarding engine implemented by hypervisor-A 114A. At 365 and 370 in FIG. 3, proxy LCP agent 520 at host-C 110C receives the control information and forwards it to SDN controller 160 via second control-plane channel 550 between them (see also 562 in FIG. 5B).

Similar steps may be performed in the reverse direction for SDN controller 160 to send any control information to host-A 110A, such as updated rules and policies, etc. At 375 in FIG. 3, SDN controller 160 sends control information destined for host-A 110A to proxy host-C 110C over second control-plane channel 550 between them. At 380 in FIG. 3, proxy LCP agent 520 at host-C 110C receives the control information associated with host-A 110A and forwards it to LCP agent 118A at host-A 110A via the data-plane channel between them.

At 385 in FIG. 3, LCP agent 118A at host-A 110A receives the control information from proxy host-C 110C. Using the control information, forwarding engine implemented by hypervisor-A 114A may apply the latest rules and policies on, for example, traffic to and from VM1 131 and/or VM2 132.

While acting as a proxy host, LCP agent 118C at host-C 110C may continue to send control information to, and receive control information from, SDN controller 160 via first control-plane channel 540 between them (see 570 in FIG. 5B). Host-A 110A may continue to use host-C 110C as a proxy host until host-A 110A is able to establish a control-plane channel with SDN controller 160 (i.e., direct control-plane connectivity). In this case, LCP agent 118A at host-A 110A may inform host-C 110C that its proxy host service is no longer required, such as by disconnecting the data-plane channel between them. This in turn triggers host-C 110C to disconnect second control-plane channel 550 with SDN controller 160, and remove proxy LCP agent 520 accordingly.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 5B. For example, a computer system may be deployed in virtualized computing environment 100 to perform the functionality of a network management entity (e.g., SDN controller 160), first host (e.g., host-A 110A), or second host (e.g., host 110B/110C/110D).

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first host to restore control-plane connectivity with a network manager in a virtualized computing environment that includes the first host, one or more second hosts, and the network manager, the method comprising:
   detecting a loss of control-plane connectivity between the first host and the network manager;
   determining connectivity status information associated with the one or more second hosts;
   based on the connectivity status information, selecting, from the one or more second hosts, a proxy host having data-plane connectivity with the first host and control-plane connectivity with the network manager; and
   restoring control-plane connectivity between the first host with the network manager via the proxy host such that the first host is able to send control information to, or receive control information from, the network manager via the proxy host, wherein restoring the control-plane connectivity comprises:
      generating, by a local control plane (LCP) agent at the first host, a first request to initiate establishment of a data-plane channel between the first host and the proxy host, wherein the first request includes a destination port number reserved for a proxy host service at the proxy host; and
      establishing the data-plane channel between the first host and the proxy host to trigger the proxy host to establish a control-plane channel with the network manager, wherein the first host sends or receives the control information via the data-plane channel and control-plane channel.

2. The method of claim 1, wherein restoring the control-plane connectivity comprises:
   sending, by the LCP agent at the first host, the first request to trigger the proxy host to spawn a proxy LCP agent to generate and send a second request to establish the control-plane channel with the network manager.

3. The method of claim 1, wherein determining the connectivity status information comprises:
   generating and sending, to the one or more second hosts, a first fault detection message to report that the first host has lost control-plane connectivity with the network manager.

4. The method of claim 3, wherein determining the connectivity status information comprises:
in response to receiving a second fault detection message from a particular second host, determining that the particular second host has data-plane connectivity with the first host, and based on the second fault detection message, determining whether the particular second host has control-plane connectivity with the network manager; and
otherwise, in absence of the second fault detection message from the particular second host, determining that the particular second host does not have data-plane connectivity with the first host.

5. The method of claim 1, wherein selecting the proxy host comprises:
selecting the proxy host from multiple second hosts that have data-plane connectivity with the first host and control-plane connectivity with the network manager based on one or more of: location, resource utilization, and whether the proxy host is currently acting as a proxy host for another host.

6. A non-transitory computer-readable storage medium that includes a set of instructions which, in response to execution by a processor of a first host, cause the processor to perform a method to restore control-plane connectivity with a network manager in a virtualized computing environment that includes the first host, one or more second hosts, and the network manager, wherein the method comprises:
detecting a loss of control-plane connectivity between the first host and the network manager;
determining connectivity status information associated with the one or more second hosts;
based on the connectivity status information, selecting, from the one or more second hosts, a proxy host having data-plane connectivity with the first host and control-plane connectivity with the network manager; and
restoring control-plane connectivity between the first host with the network manager via the proxy host such that the first host is able to send control information to, or receive control information from, the network manager via the proxy host, wherein restoring the control-plane connectivity comprises:
generating, by a local control plane (LCP) agent at the first host, a first request to initiate establishment of a data-plane channel between the first host and the proxy host, wherein the first request includes a destination port number reserved for a proxy host service at the proxy host; and
establishing the data-plane channel between the first host and the proxy host to trigger the proxy host to establish a control-plane channel with the network manager, wherein the first host sends or receives the control information via the data-plane channel and control-plane channel.

7. The non-transitory computer-readable storage medium of claim 6, wherein restoring the control-plane connectivity comprises:
sending, by the LCP agent at the first host, the first request to trigger the proxy host to spawn a proxy LCP agent to generate and send a second request to establish the control-plane channel with the network manager.

8. The non-transitory computer-readable storage medium of claim 6, wherein determining the connectivity status information comprises:
generating and sending, to the one or more second hosts, a first fault detection message to report that the first host has lost control-plane connectivity with the network manager.

9. The non-transitory computer-readable storage medium of claim 8, wherein determining the connectivity status information comprises:
in response to receiving a second fault detection message from a particular second host, determining that the particular second host has data-plane connectivity with the first host, and based on the second fault detection message, determining whether the particular second host has control-plane connectivity with the network manager; and
otherwise, in absence of the second fault detection message from the particular second host, determining that the particular second host does not have data-plane connectivity with the first host.

10. The non-transitory computer-readable storage medium of claim 6, wherein selecting the proxy host comprises:
selecting the proxy host from multiple second hosts that have data-plane connectivity with the first host and control-plane connectivity with the network manager based on one or more of: location, resource utilization, and whether the proxy host is currently acting as a proxy host for another host.

11. A first host configured to restore control-plane connectivity with a network manager in a virtualized computing environment that includes the first host, one or more second hosts, and the network manager, the first host comprising:
a processor; and
a non-transitory computer-readable medium having stored thereon instructions that, in response to execution by the processor, cause the processor to:
detect a loss of control-plane connectivity between the first host and the network manager;
determine connectivity status information associated with the one or more second hosts;
based on the connectivity status information, select, from the one or more second hosts, a proxy host having data-plane connectivity with the first host and control-plane connectivity with the network manager; and
restore control-plane connectivity between the first host with the network manager via the proxy host such that the first host is able to send control information to, or receive control information from, the network manager via the proxy host,
wherein the instructions to cause the processor to restore the control-plane connectivity cause the processor to:
generate, by a local control plane (LCP) agent at the first host, a first request to initiate establishment of a data-plane channel between the first host and the proxy host, wherein the first request includes a destination port number reserved for a proxy host service at the proxy host; and
establish the data-plane channel between the first host and the proxy host to trigger the proxy host to establish a control-plane channel with the network manager, wherein the first host sends or receives the control information via the data-plane channel and control-plane channel.

12. The first host of claim 11, wherein the instructions to cause the processor to restore the control-plane connectivity cause the processor to:

send, by the LCP agent at the first host, the first request to trigger the proxy host to spawn a proxy LCP agent to generate and send a second request to establish the control-plane channel with the network manager.

13. The first host of claim 11, wherein the instructions to cause the processor to determine the connectivity status information cause the processor to:
generate and send, to the one or more second hosts, a first fault detection message to report that the first host has lost control-plane connectivity with the network manager.

14. The first host of claim 13, wherein the instructions to cause the processor to determine the connectivity status information cause the processor to:
in response to receiving a second fault detection message from a particular second host, determine that the particular second host has data-plane connectivity with the first host, and based on the second fault detection message, determine whether the particular second host has control-plane connectivity with the network manager; and
otherwise, in absence of the second fault detection message from the particular second host, determine that the particular second host does not have data-plane connectivity with the first host.

15. The first host of claim 11, wherein the instructions to cause the processor to select the proxy host cause the processor to:
select the proxy host from multiple second hosts that have data-plane connectivity with the first host and control-plane connectivity with the network manager based on one or more of: location, resource utilization, and whether the proxy host is currently acting as a proxy host for another host.

* * * * *